UNITED STATES PATENT OFFICE.

WALTER CLEMENT BLADEN, OF NEWARK, NEW JERSEY, ASSIGNOR TO AARON C. HORN, OF NEW YORK, N. Y.

COMPOSITION FOR WATERPROOFING CONCRETE.

1,021,569.  Specification of Letters Patent.  Patented Mar. 26, 1912.

No Drawing.   Application filed December 30, 1911.   Serial No. 668,634.

*To all whom it may concern:*

Be it known that I, WALTER CLEMENT BLADEN, a subject of the King of Great Britain, and a resident of Newark, in the county of Essex and State of New Jersey, have invented certain new and useful Improvements in Compositions for Waterproofing Concrete, of which the following is a specification.

This invention relates to coating compositions and relates in particular to fluent finish compositions containing nitrocellulose or allied bodies, adapted for waterproofing and coating concrete masses; all as more fully hereinafter described and as claimed.

Ordinary Portland cement contains a considerable quantity of free alkali in the form of lime, potash and soda. Other calcareous cements also have this alkaline nature. It is difficult indeed to secure a permanent coating on a concrete surface by means of ordinary oil paints and varnishes for the reason that the free alkali present saponifies the glycerids of the oil vehicle used, thus destroying such oil vehicle and setting glycerin free. The freed glycerin, being substantially insoluble in the oil and fatty products of saponification, often remains in the coating making it porous and hygroscopic. For this and other reasons, oil paints and varnishes do not adhere well, but soon scale and peel from the surface.

In the attempt to overcome the difficulties attendant on the coating of concrete surfaces, various preliminary washes have been used thereon without very satisfactory results. For instance, the concrete surface is sometimes treated with a preliminary wash of dilute hydrochloric acid for the purpose of removing the free lime and other alkali. This however has a number of disadvantages since it destroys the bonding of the cement, thereby weakening the surface layer and causing scaling and chipping of the cement and aggregate. Other strong acids, such as oxalic acid, have been tried without satisfactory results. A number of acid salts, such as sulfate of zinc, alum and the like have been used in aqueous solution but the necessity of applying such solutions separately, as an operation distinct from the application of the paint coating, together with the delay incident on the drying out of the moisture introduced by the acid salt treatment, and the injury to the bonding of the cement due to double decomposition with the components of the cement, whereby loose and pulverulent substances are formed, has practically offset any gain derived from the neutralizing action. Solutions of ammonium carbonate have been tried for the purpose of converting the lime into carbonate of lime and though these solutions are fairly satisfactory yet they are expensive and the manipulation incident thereto also is expensive.

It is the object of the present invention to provide a composition which will readily form a coating or waterproofing layer in or on the concrete surface and neutralize the alkalinity of the cement at and near the surface of the concrete without production of crumbling substances which would cause scaling and cracking of the coated surface. It is also an object of the invention to produce at will a composition which will form what is known in the art as a "transparent" coating; that is, one which does not materially change the color of the concrete surface to which it may be applied.

Concrete is a fairly porous material as ordinarily prepared and absorbs oils very easily by capillary action. This action is known in the trade as "suction" and for the treatment of porous concrete, compositions are needed which resist suction to a considerable degree.

It is further an object of the present invention to indicate a means of securing a composition resistant to suction which has the properties requisite for application to so alkaline a material as concrete. As a basis for such compositions, I preferably make use of a colloidal body of a nitrocellulose character such for example as pyroxylin, soluble or "varnish" cotton, celluloid cotton and the like. With only a small percentage of such thickeners, highly colloidal solutions may be obtained which resist the action of suction. These nitrocellulose bodies also are quite immune to disintegration by cement-alkali. They possess strong filming qualities serving to bind or knit together the other ingredients of the composition. And, owing to the flexibility of the dried film an elasticity as well as a degree of toughness and adaptability to severe climatic conditions is secured. A second ingredient of my composition is a drying oil or preferably the fatty acid of a drying oil. While linseed, fish, corn, soy bean, cotton seed, and other drying and semi-drying oils may be used, I prefer the drying oils of the Chinese wood oil type. The fatty acids derived from Chinese wood oil, or tung oil, blend especially well with nitrocellulose and dry rapidly on exposure. Also they combine easily with lime to form lime soaps not easily hydrolyzed on prolonged exposure to moisture. Chinese wood oil gelatinizes when heated for a short time at about 250 degrees centigrade and from this gelatinized product fatty acids may be obtained which are especially effective. A simple manner of obtaining the fatty acid is to saponify the raw oil with caustic soda and then add sufficient acid to neutralize. The fatty acids are separated, washed and dried, when they are ready for use.

A preferred ingredient of my composition is a fatty acid of a non-drying oil. Oleic acid or commercial red or elaine oil serves well for this purpose although other similar oils may be used. Oleic acid serves particularly as a clarifying and waterproofing agent. It is to be sure not entirely devoid of drying properties, but relatively its siccative properties are so slight that the oil may be regarded as non-drying.

Another desirable component of such a composition is a resinous body. According to their nature the resins have different effects on the physical appearance of the coating obtained with the composition. Resins of the sandarac type readily yield a dull or matt finish while dammar and Manila copal tend to give a glossy finish. As a "transparent" coating preferably should be free from gloss, sandarac is very useful in this connection; but of course various other resins may be used according to circumstances. Another function of the resin is that of reducing the body of the nitrocellulose solution in those cases where a relatively large proportion of the nitrocellulose is desired without excessive body. Sandarac is very well fitted for this purpose, in addition to its flatting action. The vehicle for dissolving and carrying these solvents is preferably composite. In the first place, a good solvent for nitrocellulose is required. Such a solvent is found in acetone, methyl acetone, methyl ethyl ketone, methyl and ethyl acetate and the like. To prevent whitening of the nitrocellulose film a slowly evaporating solvent such as amyl alcohol or amyl acetate may be used in moderate amount. The coal tar naphthas, such as benzol, and the petroleum hydrocarbons such as benzin, are used to advantage as resin and fatty acid solvents and extending thinners. As nitrocellulose is not soluble in these hydrocarbon bodies care should be taken not to use too great a proportion of the latter, for thereby the toughness and elasticity of the coating would be impaired. Of the total solvents employed the benzol or benzin extender should not ordinarily exceed 40%.

To illustrate the invention the following formula is given, it being understood that various omissions or substitutions may be made therein, as will now be apparent to those skilled in the art to which this invention appertains; all without departing from the scope and spirit of the invention. By weight, seven parts of amyl acetate, 16 parts of benzol, 30 parts of methyl alcohol and seven parts of acetone are mixed and placed in a tank fitted with an agitator. 8 parts of soluble cotton containing about 11.3% of nitrogen, are added and well agitated to effect solution. 10 parts of sandarac resin are introduced and dissolved. 10 parts each of oleic acid and the fatty acids of tung oil are thinned by heating and introduced. The batch is then well agitated to effect a thorough incorporation of the ingredients. If desired, a small amount of drier, such as manganese oleate may be added, in order to render the tung oil acids capable of rapidly drying on exposure. A small percentage of petrolatum or petroleum jelly may likewise be added to improve the "transparent" effect. The odor of the composition may be modified by the addition of oil of mirbane, Russian turpentine and the like.

As stated, I do not wish to limit myself to the precise formula above set forth, but may invoke the doctrine of equivalency, in so far as same may be herein applicable; my invention essentially comprising a fluent solution of nitrocellulose or similar colloidal thickener in conjunction with the fatty acid of a drying oil, preferably tung oil acid; carrying also preferably a non-drying fatty acid as a clarifying and waterproofing agent, specifically oleic acid, preferably also a resinous body, specifically sandarac, which has a flatting action; and the solvent medium preferably carrying, in addition to an efficient solvent for nitrocellulose, an extending medium of the nature of benzol or benzin, effective as a solvent for resins and fatty acids.

While I prefer to combine ingredients which are capable of forming a transparent coating for concrete, brick, tile, plaster, stone and the like, I do not limit myself thereto, but may use ingredients which sensibly change the color of the coated object and may if desired make use of dyes or pigments suitable for the purpose.

What I claim is:—

1. A composition for waterproofing concrete comprising a solution of nitrocellulose and the fatty acid of a drying oil.

2. A composition for waterproofing concrete comprising a solution of nitrocellulose and the fatty acid of tung oil.

3. A composition for waterproofing concrete comprising a solution of nitrocellulose, the fatty acid of a drying oil, and a resinous body.

4. A composition for waterproofing concrete comprising a solution of nitrocellulose, tung oil acid, and a resinous body.

5. A composition for waterproofing concrete comprising a solution of nitrocellulose, tung oil acid and sandarac resin.

6. A composition for waterproofing concrete comprising a solution of nitrocellulose, tung oil acid, oleic acid and a resinous body.

7. A composition for waterproofing concrete comprising a solution of nitrocellulose, tung oil acid, oleic acid and sandarac resin.

8. A composition for waterproofing concrete comprising nitrocellulose, tung oil acid, oleic acid, sandarac resin and solvents therefor.

9. A composition for waterproofing concrete comprising nitrocellulose 8%, tung oil acid 10%, oleic acid 10%, sandarac resin 10%, amyl acetate 7%, methyl alcohol 30%, acetone 7% and benzol 16%.

Signed at Montclair in the county of Essex and State of New Jersey this 18th day of December A. D. 1911.

WALTER CLEMENT BLADEN.

Witnesses:
MILTON E. LUZENBERG,
MARIA E. LUZENBERG.